(12) United States Patent
Xam-Mar Mangrane

(10) Patent No.: US 11,666,423 B2
(45) Date of Patent: Jun. 6, 2023

(54) DENTAL IMPLANT REPLICA FOR A DENTAL MODEL MANUFACTURED WITH 3D ADDITIVE TECHNOLOGY

(71) Applicant: TALLADIUM ESPANA, S.L., Lleida (ES)

(72) Inventor: Esteban Xam-Mar Mangrane, Lleida (ES)

(73) Assignee: TALLADIUM ESPANA, S.L., Lleida (ES)

( * ) Notice: Subject to any disclaimer, the term of this patent is extended or adjusted under 35 U.S.C. 154(b) by 1073 days.

(21) Appl. No.: 16/317,907

(22) PCT Filed: Jul. 13, 2017

(86) PCT No.: PCT/ES2017/070510
§ 371 (c)(1),
(2) Date: Jan. 15, 2019

(87) PCT Pub. No.: WO2018/011452
PCT Pub. Date: Jan. 18, 2018

(65) Prior Publication Data
US 2021/0290350 A1   Sep. 23, 2021

(30) Foreign Application Priority Data
Jul. 15, 2016   (ES) .............................. ES20163092U

(51) Int. Cl.
*A61C 13/00* (2006.01)
*A61C 9/00* (2006.01)
(Continued)

(52) U.S. Cl.
CPC .......... *A61C 13/0013* (2013.01); *A61C 9/002* (2013.01); *A61C 13/0019* (2013.01); *A61C 13/34* (2013.01); *B29C 35/00* (2013.01)

(58) Field of Classification Search
CPC . A61C 13/0013; A61C 13/0019; A61C 13/34; A61C 9/002; A61C 8/00–0098; B29C 35/00
(Continued)

(56) References Cited

U.S. PATENT DOCUMENTS

2011/0294093 A1* 12/2011 Herweg ............... A61C 8/0001
433/172
2013/0216980 A1* 8/2013 Boronkay .......... A61C 13/1009
433/213
(Continued)

FOREIGN PATENT DOCUMENTS

EP   3 067 009 A1   9/2016
FR   2 889 050 A1   2/2007
(Continued)

OTHER PUBLICATIONS

International Search Report for PCT/ES2017/070510 dated Dec. 13, 2017 [PCT/ISA/210].
(Continued)

*Primary Examiner* — Matthew M Nelson
(74) *Attorney, Agent, or Firm* — Sughrue Mion, PLLC

(57) ABSTRACT

The present invention of a digital dental implant replica for a dental model manufactured with 3D additive technology and a system relates to a digital dental implant replica to simulate the position of the dental implant in a dental model which has been produced by means of 3D printing processes or CAD/CAM systems, providing greater precision and maneuverability with respect to analog systems in the orientation of the implant in the dental model due to a simple retention system which is easy to use and detachable.

12 Claims, 9 Drawing Sheets

(51) Int. Cl.
*A61C 13/34* (2006.01)
*B29C 35/00* (2006.01)

(58) Field of Classification Search
USPC .......................................... 433/213
See application file for complete search history.

(56) References Cited

U.S. PATENT DOCUMENTS

2015/0230897 A1* 8/2015 Bederak ............... A61C 8/0001
    433/213
2019/0254792 A1* 8/2019 Boronkay ................ A61C 8/00
2021/0290350 A1* 9/2021 Xam-Mar Mangrane ...................
    A61C 13/34

FOREIGN PATENT DOCUMENTS

| WO | 2005/053564 | A2 | 6/2005 |
| WO | 2011/034781 | A2 | 3/2011 |

OTHER PUBLICATIONS

Written Opinion for PCT/ES2017/070510 dated Dec. 13, 2017 [PCT/ISA/237].

* cited by examiner

DENTAL IMPLANT REPLICA FOR A DENTAL MODEL MANUFACTURED WITH 3D ADDITIVE TECHNOLOGY

CROSS REFERENCE TO RELATED APPLICATIONS

This application is a National Stage of International Application No. PCT/ES2017/070510, filed on Jul. 13, 2017, which claims priority from Spanish Patent Application No. U201630920, filed on Jul. 15, 2016.

OBJECT OF THE INVENTION

The present invention of a digital dental implant replica for a dental model manufactured with 3D additive technology relates to a digital dental implant replica to simulate the position of the dental implant in a dental model which has been produced by means of 3D printing processes or CAD/CAM systems, providing greater precision and maneuverability with respect to analog systems in the orientation of the implant in the dental model due to a simple retention system which is easy to use and detachable. It likewise refers to a system made up of the replica and the dental model.

The digital dental implant replica is a compact body which preferably begins in a cylindrical shape and preferably ends in a conical shape, although another fifteen geometric shapes are possible. The replica is formed by an implant connection, an initial body and a final body.

The digital dental implant replica, object of the present invention, is especially designed to be used with dental models which have been digitally processed using CAD-CAM technology and 3D additive technology (3D printing) after scanning the mouth of the patient. Defined in these models, and in CAD-CAM libraries, is the skin or surface limit of the dental model where the replica is to be inserted.

The present invention is especially intended be applied in the dental industry, and more specifically the area of prosthetic dentistry.

BACKGROUND OF THE INVENTION

Replicas of dental implants are used for the production of dental models which reproduce the position of the implant in the patient's mouth. Known in the state of the art are analog replicas for dental models in which a negative is first taken of the jaw, using impression material, and by means of impression posts the position of the implant is reproduced. Once the paste solidifies, the impression tray is removed and an impression is produced. The replica is inserted, joined to the impression post through the connection of the replica, positioning it, and it is subsequently filled with plaster. After hardening, the model of the patient's mouth is obtained with the replica incorporated.

In the described system for the production of physical molds, the positioning of the replica becomes somewhat complex and does not allow the decoupling thereof without causing serious internal tensions in the dental model. Known in the state of art is a replica which incorporates the use of a standard sleeve which allows for the coupling and decoupling of the replica in the physical dental model, yet it is hardly advantageous in that it does not contain information which would make it possible for it to be inserted in a dental model produced by means of 3D printing or CAD/CAM systems.

Likewise, in the field of dental restoration the design and manufacturing methods of crowns and bridges mounted on dental implants provides increasingly more precision thanks to the incorporation of systems of digitalization, data processing and manufacturing through electronic devices.

Specifically, digital dental scanning has significantly improved the precision with which the position of the patient's implant is obtained. This has allowed for the incorporation of other systems which provide greater precision in the entire design and manufacturing process, as well as for the appearance of new elements which provide characteristics with advantages over the traditionally used analog replicas.

Known in the state of the art are analog dental implant replicas for analog dental models which are cylindrical with an outer threading on the lower end thereof by which they are attached to the physical model of the mouth by means screwing the same to a fastening nut. This is a complex attachment system which requires the use of tools for the positioning and tightening of said replicas, in addition to oversized assembly which is necessary, given that it requires a nut with an outer diameter greater than that of the replica. In turn, also known are implant replicas which have a cylindrical or conical shape specially designed to be inserted in CAD/CAM models. The geometry of the replica includes on the lower part thereof a minimum of two cut surfaces, which allow the replica and the model to fit together on the intermediate plane between the two areas into which the replica is divided, which may cause it to be poorly set by basing much of its support on this surface which divides both areas of the replica as well as on the lower plane.

On the other hand, not known in the state of the art are dental implant replicas to be used in digital replicas of dental models manufactured with 3D additive technology or 3D printing, which allows for the manufacturing of the dental model after the patient's mouth has been scanned, thereby avoiding the previously described method using plaster. Since these dental models, manufactured by means of additive technology, are manufactured by adding layers of material which are placed one on top of the other until the dental model is formed, they have the disadvantage that, in the manufacturing of inclined surfaces and, therefore, of holes with an inclination with respect to the base, micro-steps (each micro-step at the height of the layer of added printing material) are created, due to the varying heights of the added layers on those surfaces which should be continuous and/or curved. Perfectly continuous surfaces would only exist on the planes or holes that are perfectly perpendicular to the base, which are not very common in the dental field. Inside these holes created in the dental model, in which by replacing angles which are supposedly right angles with curves they become curves with micro-steps, is where the dental implant replicas will be placed, and due to the limitations in the 3D additive manufacturing of dental models, a digital dental implant replica which adapts perfectly to the hole or housing of the dental model is required in order to enhance the precision of mounting the replica in the dental model.

Analog dental implant replicas in the state of the art may not be used in dental models made with 3D additive technology since they cannot be adapted to the constructive limitations of this type of manufacturing and, therefore, are not able to achieve the necessary precision.

DESCRIPTION OF THE INVENTION

The present invention relates to a digital dental implant replica according to claim 1. Specifically, the digital implant replica, object of the present invention, is a dental implant replica for a hole of a dental model manufactured with 3D additive technology, and made in three dimensions, and to be placed on the longitudinal axis of the hole of said dental model, the replica being made up of a body with a proximal end and a distal end which determine between them a distal segment and a proximal segment, in which:

The proximal segment comprises means for positioning the replica in the dental model which comprise a curved surface on the proximal end for the positioning of the height of the replica in the hole, and The distal segment comprises means for connecting the replica to a dental prosthesis.

The positioning means for positioning the replica in the dental model have said curved surface to adapt to the surfaces of the hole, which comprises micro-steps, and specifically to the bottom of the hole where, instead of a perfectly right angle, there is a curved groove formed by micro-steps produced by additive manufacturing.

This curve on the end allows the necessary precision to be achieved when the replica is inserted in the 3D oral model, meaning great precision is achieved in mounting the replica in the dental model. This is so because, since said curve does not exist, when the hole of the dental model is inclined with respect to the base of said model, the imperfections caused by the micro-steps at the bottom of the hole would prevent the replica from being set in its definitive position, thus preventing its approximation to the real situation. Specifically, since the replica cannot be inserted into the support position, it would be partially outside the hole and would therefore be less precise.

Likewise, other positioning means for the replica located in said proximal segment comprise:

Angular and axial positioning means which prevent the rotation of the replica on the axis, Additional positioning means for height which help place the replica at the correct height in the hole, and Connection means for connecting to the dental model placed at the proximal end.

In spite of the fact that the positioning means may have different configurations, the angular and axial positioning means are preferably a flat surface, rising from a cross-sectioned surface of the body of revolution of the replica, while the additional height-positioning means are a notch located in the body of the replica and which corresponds, once the replica is installed, to a protrusion in the hole of the dental model. As was previously mentioned, this notch is complementary to the curved surface at the proximal end which allows the replica to be placed at the correct height in the hole and prevent said curved surface from coming into contact with the corner formed by the surfaces at the bottom of the hole in the dental model.

For the connection of the replica to the dental model, the replica comprises an inner threading on the distal end thereof, wherein a fastening screw will be housed. Likewise, the connection means for connecting the replica to a dental prosthesis are a threaded perforation for the connection of the abutments or prosthetic attachments.

The connection means for connecting the replica to the dental model comprise connection elements for connecting to removable fastening means, said removable fastening means preferably being a screw inserted in the lower part of the dental model, in a cavity, until it butts against the inner surface of the dental model and being screwed into the inside of the replica, wherein the threading is located as a connection element. Thanks to these connection means, a detachable system is created between the implant replica and the dental model, according to claim 10.

On the other hand, the shape of the implant replica is complementary to the shape of the hole of the dental model in which it will be housed, such that said dental or oral model comprises a surface that is theoretically flat, but which in reality is not, due to the aforementioned limitations of 3D additive manufacturing which forms micro-steps on the inclined surfaces of the hole, and which the curved surface for vertical positioning of the implant replica avoids in order to achieve greater precision in the vertical positioning of the implant replica on the base of the hole. The foregoing is complemented by the flat surface in order to allow for the introduction of the implant replica, which coincides with the surface derived from sectioning the body of the replica and allows for the angular positioning thereof and, additionally, a protrusion which is housed in the notch of the implant replica.

The assembly of the replica and the dental model forms the detachable system which allows for the fastening of the replica to the dental model in a simple way, thanks to the structure of the replica which, once inserted in the hole of the dental model, prevents it from moving vertically and/or axially or rotationally, facilitating the insertion of the connection or fitting means for connecting or fitting the replica to the dental model.

As was already mentioned, for the use of the digital replicas, object of the present invention, on models manufactured with additive technology, it is first necessary to print the oral model in order to later place the replica in the same. Said oral model has holes created by the information stored in a CAD-CAM library.

Optionally, digital replicas, object of the present invention, may be used in dental models that have been milled. The method followed would be similar to the previous one, in other words, based on CAM dental software, milling strategies are created for the oral model in order to mill said model with the holes where the replicas will be inserted. The material with which milling may be done is not limited to any specific material, and could be, for example, urethane or plaster, nor are there any limitations with regard to dimension or shape. This milling must be done on a five-axis machine.

The work method would consist of:

Placing the scanbody or scanbodies in the implants in the patient's mouth.

Scanning the patient's mouth using a scanner, preferably an intraoral scanner, which reads the position of the scanbody or scanbodies in the patient's mouth.

Creating a 3-dimensional (3D) file of the position of the implant or positions of the implants after the scan, based on the position of the scanbody or scanbodies in the mouth.

From said 3D file, done by a dentist and representing the oral model of the patient, the CAD design will be made of said oral model by a prosthodontist. Said prosthodontist, by means of a computer program or CAD software, will make the model of the patient's dental structure, in other words, designing what will be the patient's dental prosthesis, which is subsequently milled using metal, zicronium or polyether ether ketone (PEEK), as well as the design of the oral model, meaning the reproduction of the patient's mouth to later be printed in 3D. The file of said 3D oral model will have the holes in the complementary shape of the digital replica, object of the present invention, which is created from the data in the CAD libraries, designed exclusively for said digital replicas. As was previously mentioned, the hole will have the necessary skin or surface area to ensure said hole has the outer shape of the digital replica, such that after the oral model is printed, the digital replica, object of the present invention, is perfectly placed.

By means of the previously mentioned procedure, a three-dimensional dental model is achieved which reproduces the patient's mouth with the hole or holes arranged wherein the dental implant or implants are located, such that said hole or holes allow for the perfect placement of the digital replica or replicas to be inserted. The hole, the replica and the scanbody are associated with one another through the CAD libraries which have been designed for said purpose.

BRIEF DESCRIPTION OF THE FIGURES

The following figures, which show an exemplary embodiment of the invention and facilitate the comprehension thereof, are attached below, along with the detailed description of the aspects of the invention.

DESCRIPTION OF A PREFERRED EMBODIMENT

Figure 1:
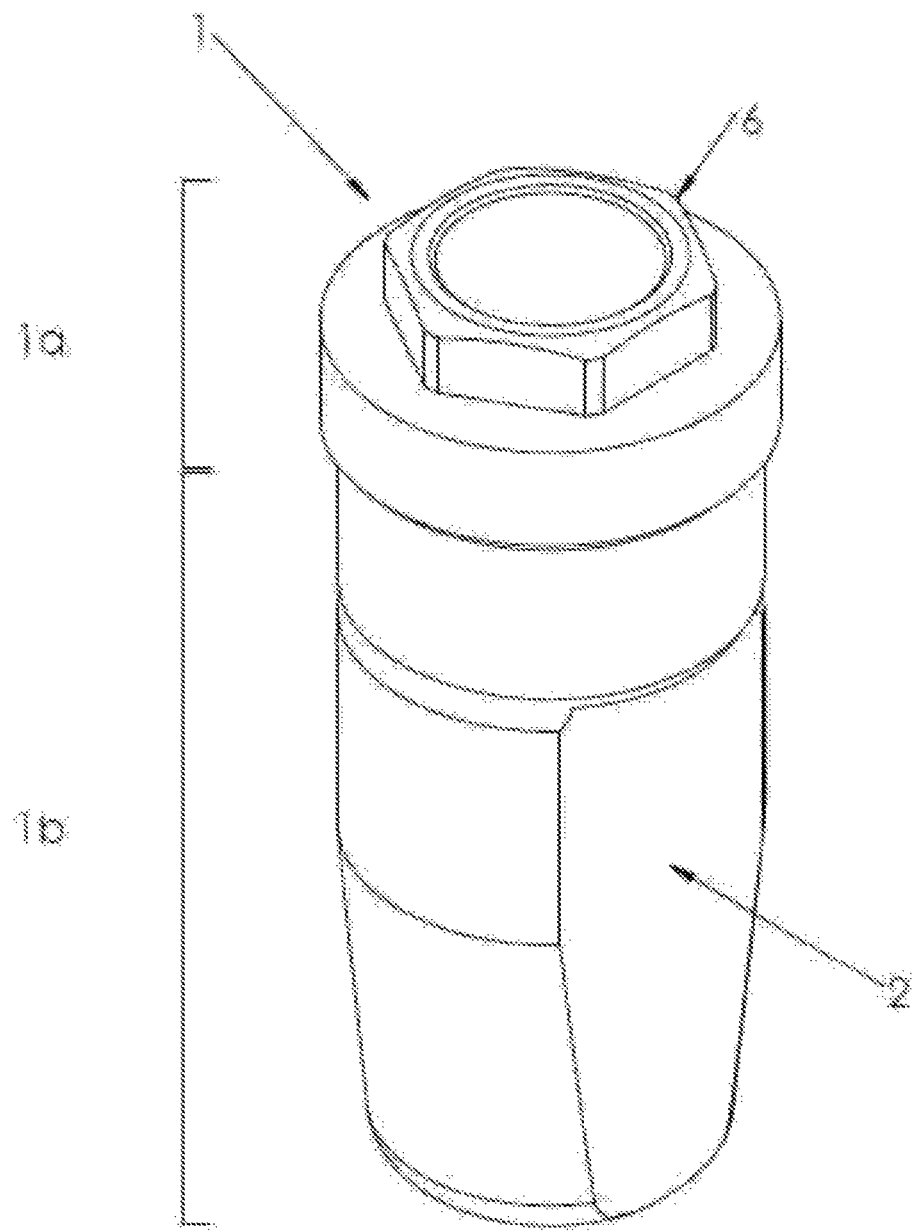
FIG. 1 shows a perspective view of the digital implant replica.
Figure 2:
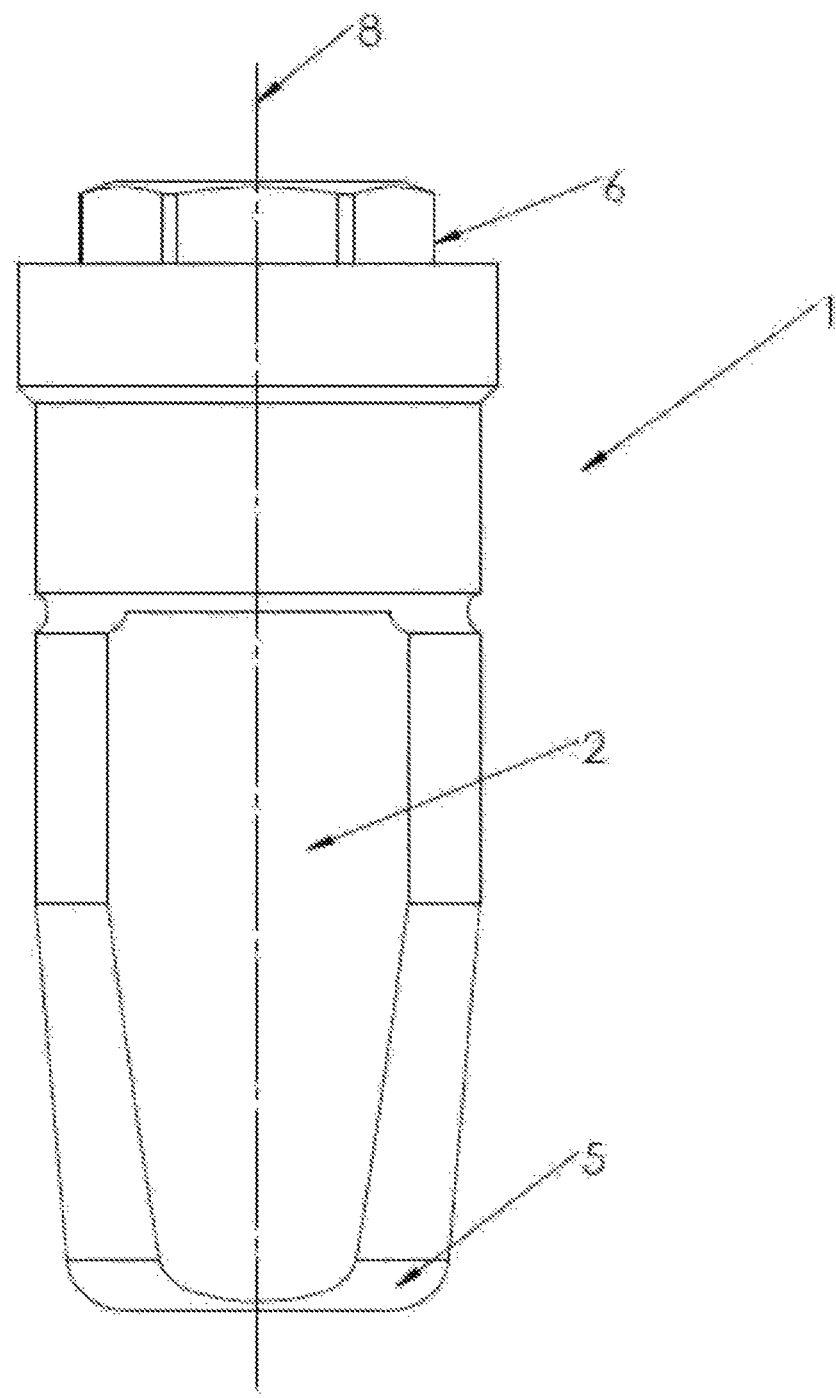
FIG. 2 shows an elevation view of the replica.
Figure 3:
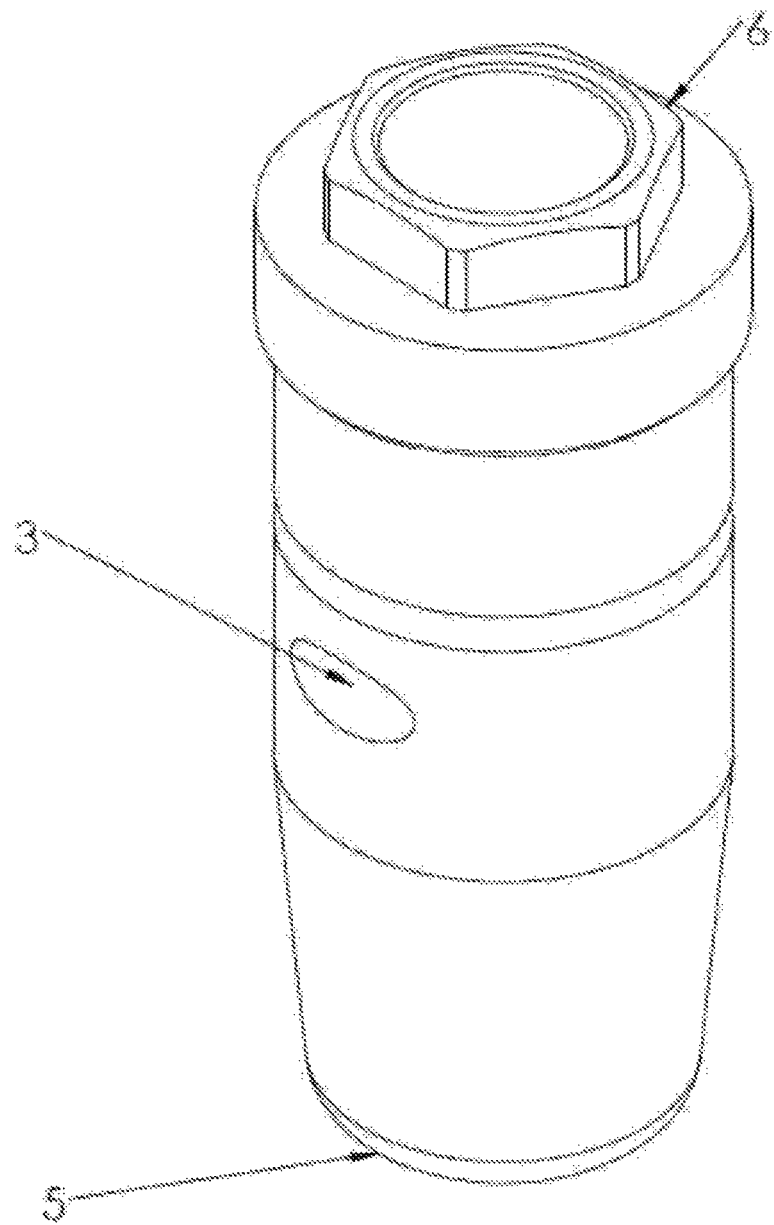
FIG. 3 shows a perspective view of the replica.

Based on the mentioned references, a description of a preferred embodiment of the replica 1 of the present invention and of the characteristics thereof is presented below.

The replica 1 will be introduced in a dental model 10 of a patient to simulate the position of the dental implant in said dental model 10, the implant replica 1 having been produced by means of 3D printing processes or CAD/CAM systems, in order to therefore provide greater precision and maneuverability in the mounting and orientation of the implant in the dental model 1 due to a simple retention system which is easy to use and detachable.

Prior to the introduction of the dental implant replica 1, it is necessary to have the dental model 10 of the patient wherein the replica 1 will be placed. Therefore, a scanning process of the element to be restored is carried out, obtaining a file with the virtual dental model 10 of the patient which includes the data of an intraoral scanbody, which subsequently, and by means of CAD-CAM libraries, allows a hole 11 to be created in the dental model 10, intended to receive the replica 1 in order to be coupled to said hole 11.

This dental model 10 will be manufactured by means of 3D printing or additive technology. In this way, a highly precise personalized physical dental model 10 is obtained and incorporates a hole 11 adapted to the replica 1. The geometry of the hole 11 is such that the replica of the implant 1 can be easily removed, constituting a detachable system which has a great advantage. The positioning of the replica 1 is done by means of retention mechanisms which impede the rotation thereof and guarantee its correct setting in the dental model 10.

The hole 11 envisaged for the insertion of the replica 1 is divided into three longitudinal zones. The first zone 11a corresponds to the upper part of the digital replica 1, and has a diameter, or outer measurement, adapted to the diameter or external measurement of the connection of the replica 1. The second longitudinal zone 11b preferably begins with a cylindrical section, or another geometric shape such as conical, and preferably continues with a conical shape, or another possible geometric shape, such as cylindrical, said second zone finishing in a curved surface 12 which serves as a vertical detention surface for the replica 1. The assembly of the first zone 11a and the second zone 11b of the dental model 10 fit to the geometry of the replica 1, to the distal segments 1b and proximal segments 1a. The third longitudinal zone 11c is equivalent to the connection area of the replica 1 and has a cylindrical shape with a variable diameter to fit to the geometry of the fastening means, preferably a screw 9, which will couple the replica 1 to the dental model 10.

Figure 4:
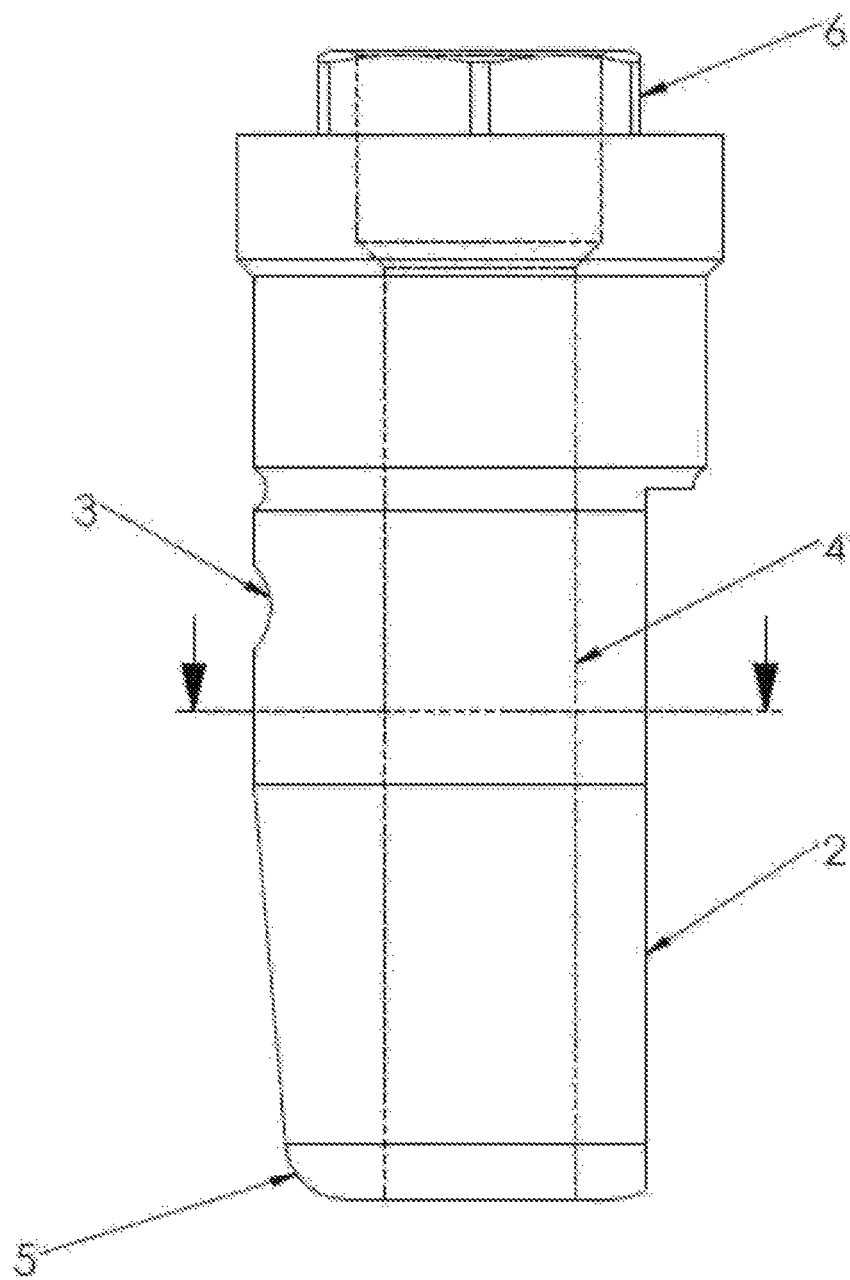
FIG. 4 shows an elevation view of the replica.
Figure 5:
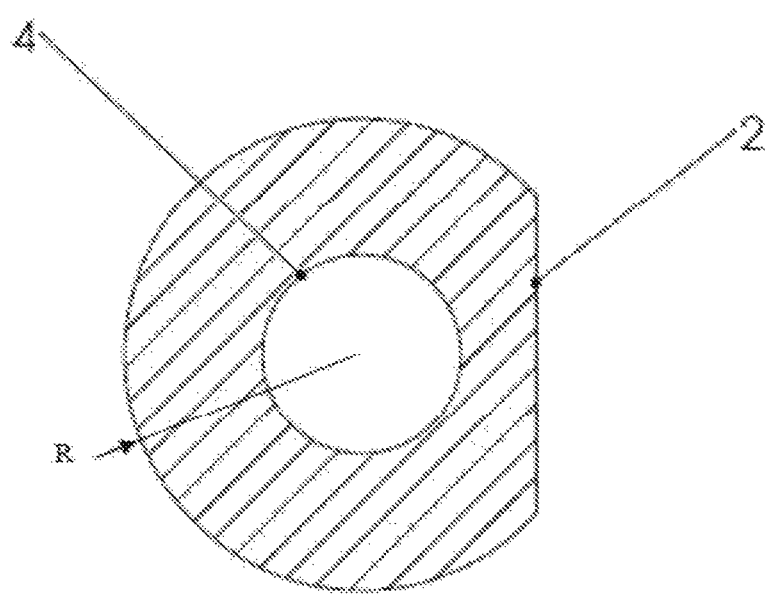
FIG. 5 shows a cross section of the proximal segment of an asymmetric implant replica.
Figure 6:
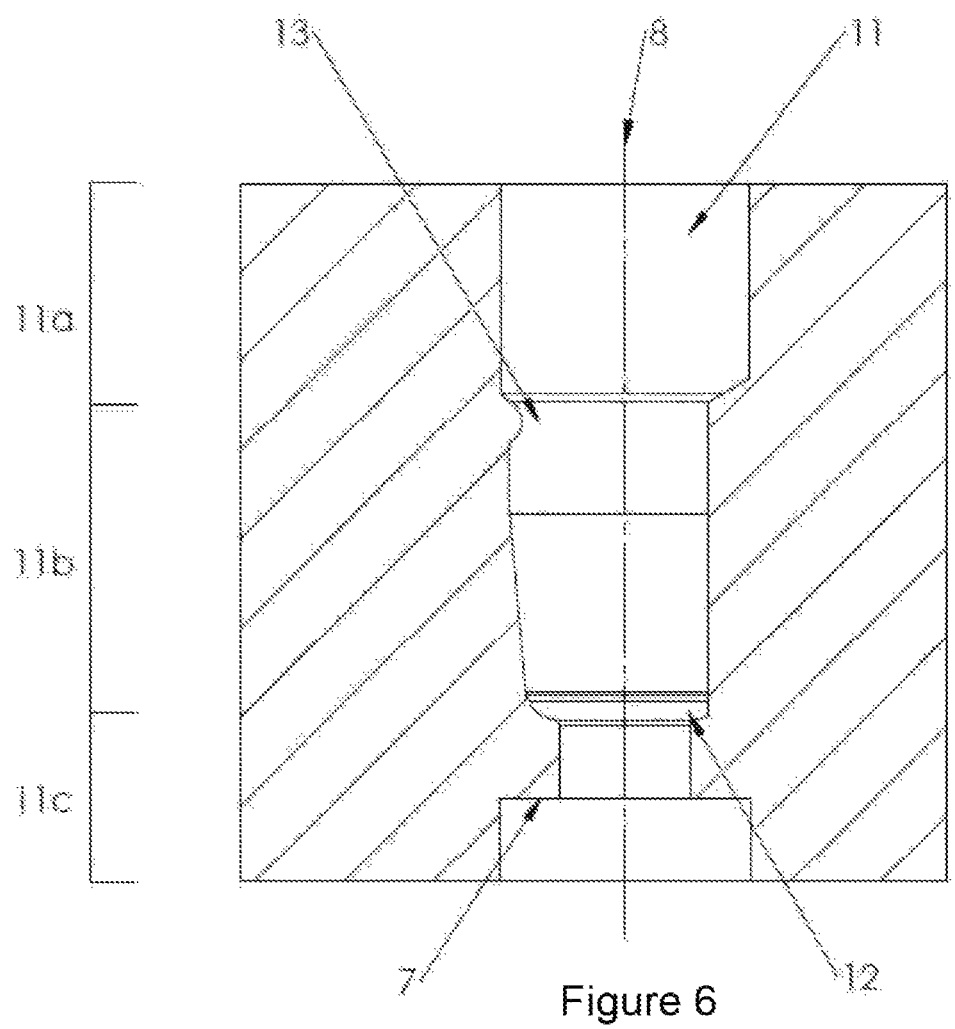
FIG. 6 shows the shows the cross section of the physical model wherein one can see the geometry of the predesigned hole in which the replica is inserted.
Figure 7:
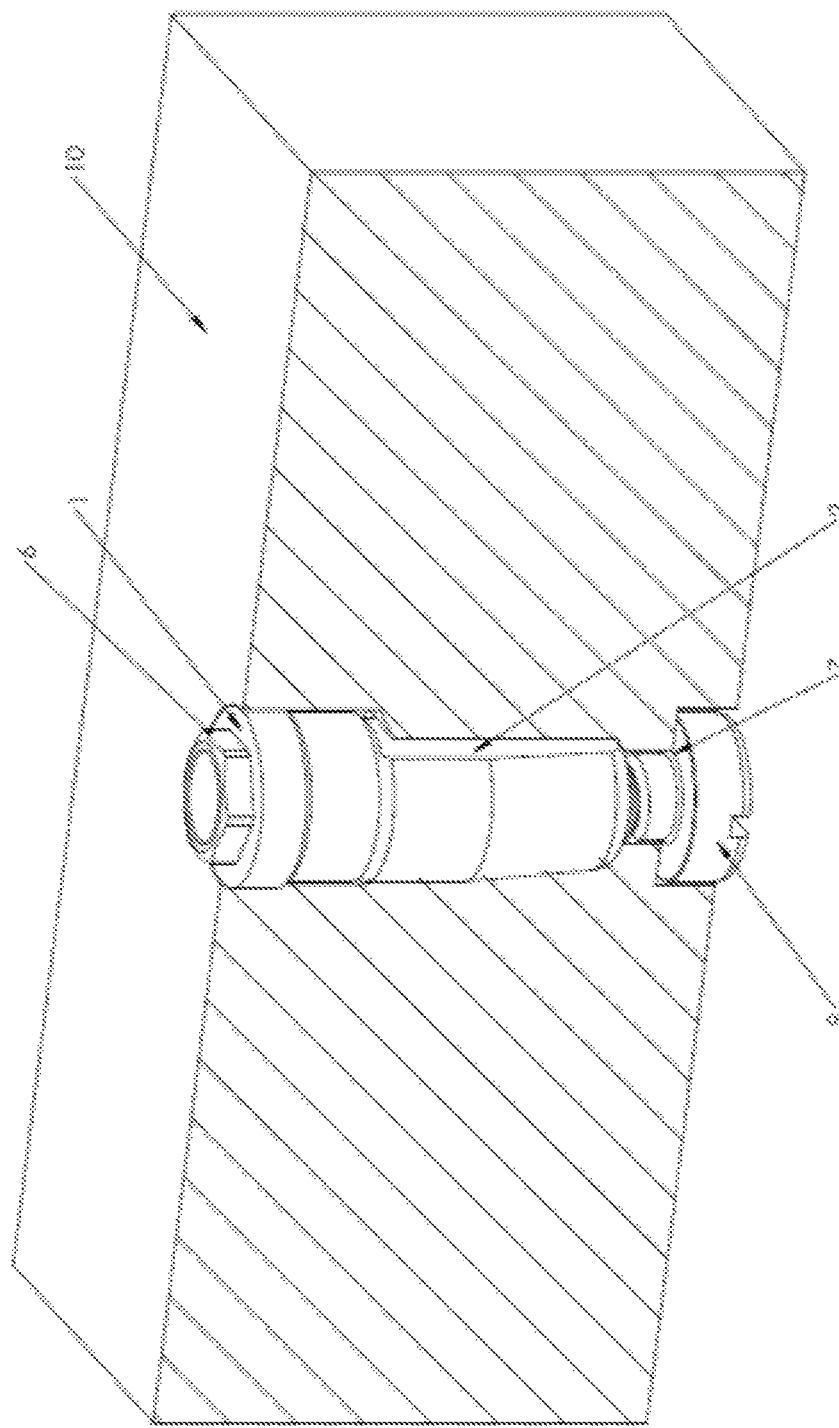
FIG. 7 shows a partially sectioned perspective view with the replica inserted in the hole of the physical dental model (sectioned) and in which it may be seen how the dental model and the implant replica fit together.
Figure 8:
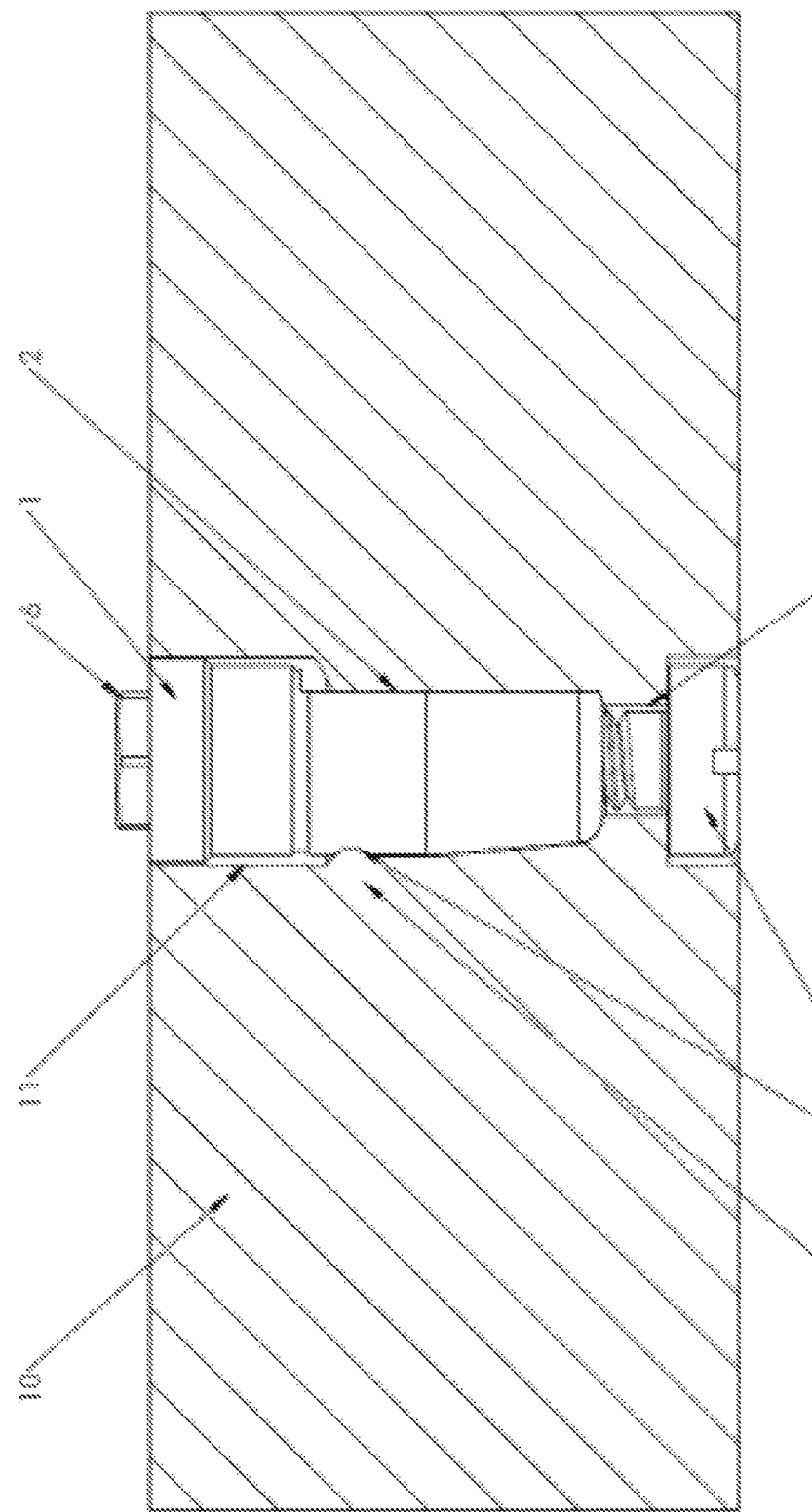
FIG. 8 shows a partial cross-sectional elevation view with the replica inserted in the physical dental model, in which the through-hole of the replica and the incorporation of the setting screw are shown.
Figure 9:
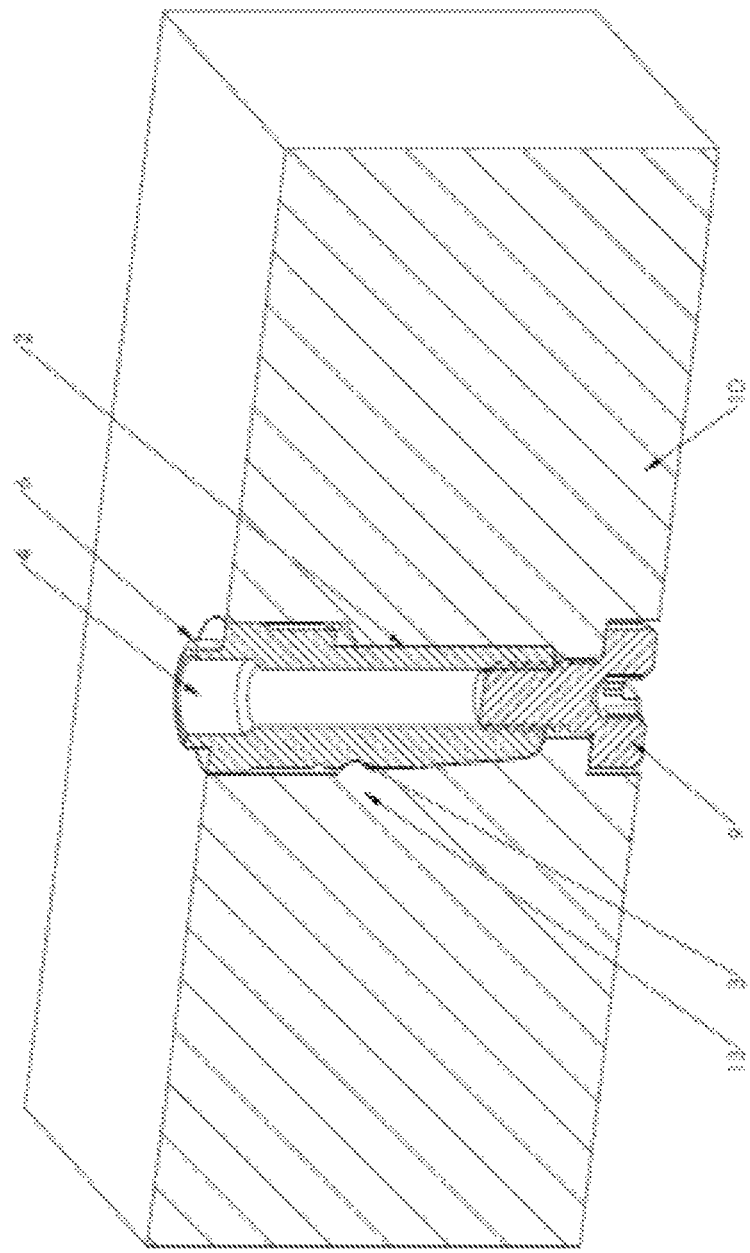
FIG. 9 shows a cross-sectional perspective view in which the replica, the dental model and the setting screw are seen.

The replica is preferably designed as a body of revolution with a proximal end and a distal end which determine between them a distal segment or section 1a and a proximal segment or section 1b, the preferred shape of the body being a cylindrical-conical element, or another geometric combination which allows for the height-positioning thereof with respect to the longitudinal axis, to fix the piece at a specific height, as well as an axial and/or angular positioning, to fix the piece at a specific angular position. As was previously mentioned, the body of revolution of the replica 1 is divided in two longitudinal segments or sections: a distal segment 1a with preferably cylindrical geometry and which includes the connection 6 of the replica 1, and a proximal segment 1b with a cross section that is preferably variable and which includes elements that make it possible to position the replica 1. Said replica incorporates a perforation 4, preferably with a through internal threading, although it is not necessary for it to be through, on the proximal end 1b thereof, and which serves both for the connection of the prosthesis to the replica 1 through the connection means 6 of the distal end as part of the lower fastening, through the proximal end, of the replica 1 to the dental model 10. The cross section perpendicular to the longitudinal axis 8 has an increasing or constant section from the proximal end of the replica, close to the free end of the proximal segment 1b, approximately to the place where the proximal segment 1b and the distal segment 1a are joined. The radius of the replica R, shown in FIG. 5, a cross section of FIG. 4, with respect to the longitudinal axis 8, is preferably between 1 mm and 3 mm, based on the system used for the dental implant. The length of the replica, which varies based on the system of the dental implant, is between 5 mm and 20 mm.

The replica 1 comprises on the proximal segment 1b thereof a vertical plane 2, or vertical sectioned surface 2 of the body of the replica 1, which impedes the axial rotation or movement of the replica 1 with respect to the longitudinal axis 8. The shortest distance between the sectioned vertical surface of the body 2 and the longitudinal axis 8 is less than the radius of the aforementioned replica. For the positioning of the height in the hole 11 of the dental model 10, it has a concave notch 3 which unavoidably fits with its convex equivalent 13 located in the second longitudinal zone 11b of the dental model 10. The proximal segment 1b of the replica ends at the proximal end and preferably at a curved surface 5 which constitutes the support surface with the detention surface 12 in the dental model 10, guaranteeing the correct height-positioning of the replica 1 with respect to the longitudinal axis 8.

Once the replica 1 is positioned with respect to the predefined hole 11 in the dental model 10, the same is blocked in the dental model 10 by means of the insertion of a fastening screw 9 in the lower area of the hole 11 of the model 10 impeding any movement of the replica 1 in a longitudinal direction. The design allows the professional to initially position the fastening screw 9 without the need of additional tools which could make the procedure difficult, and moreover, it allows the professional to make the correct final adjustment by means of a screwdriver. The fastening screw 9 allows the digital replica to be adjusted against the protruding surface 7, located in the third longitudinal zone 11c of the dental model 10, and which limits the advance of the screw 9 in the interior of the dental model 10. The blocking of the replica 1 by means of a fastening screw 9 allows the professional to do any type of check up or work with the replica 1 without the risk of unintentionally moving it.

The insertion of the replica 1 in the dental model 10 is done from the upper part of the model 10, coupling the vertical surface 2 which impedes the rotation of the replica 1 in the second zone 11b of the hole 11, and fitting the concave notch 3 of the replica 1 to the convex notch 13 in the upper end of said second zone 11b of the model 10 until reaching the curved surface 12, in the lower end of said second zone 11b, where the proximal end 5 of the replica is supported. Lastly, the replica 1 is fastened to the dental model 10 by means of the fastening screw 9 and as was previously described.

As was previously mentioned, the distal end of the distal segment 1b of the replica 1 incorporates a connection 6 and a perforation 4 with an inner threading, both being designed based on the type of dental implant which will be positioned in the replica. The positioning of the profile of the connection 6 is directly related to the sectioned surface 2 of the body of the replica 1, such that if the connection 6 of the replica 1 is an outer hexagon (as shown in the figures), the sectioned surface 2 of the replica is parallel to one of the faces of the hexagon of the connection 6.

Therefore, in light of the foregoing, the present invention provides great advantages in the precision of the orientation due to the fit between the replica 1 and the hole 11 of the dental model 10 by means of the curved surface 5 of the proximal segment 1b of the replica 1 to the model 10, the concave notch 3 and the anti-rotational plane 2, which guarantees great precision in the longitudinal, axial and rotational positioning of the replica 1 in the hole 11 of the model 10.

Once the replica 1 is mounted in the dental model 10, on the prosthetic connection 6, the abutments or attachments will be connected to the replica 1.

Likewise, the figures show a system formed by a replica 1 and a dental model 10 according to that which was previously described.

The present invention is not limited to the previously described embodiments. Rather, different modifications and variations are possible within the scope of the described claims.

The invention claimed is:

1. A dental implant replica for a dental model digitally processed using CAD-CAM technology and manufactured with 3D additive technology after scanning the mouth of the patient, said dental model having a hole with a bottom, with a longitudinal axis, and the replica being made up of a body with a proximal end and a distal end which determine between the distal end and the proximal end a distal segment and a proximal segment, wherein:
   the proximal segment comprises means for height positioning the replica in the dental model, said means comprises a curved surface on the proximal end of the replica for height positioning of the replica in the bottom of the hole,
   the distal segment comprises connection means to connect the replica to a dental prosthesis, and
   the proximal end comprises connection means to connect the replica to the bottom of the hole in the dental model; and
   wherein the replica further comprises a sectioned vertical surface on the proximal segment, the sectioned vertical surface extending to the proximal end of the replica;
   wherein the curved surface extends around an entire perimeter of the proximal end except where the sectioned vertical surface extends at the proximal end, such that a cross-section of the replica taken in a plane orthogonal to a longitudinal axis of the replica is non-circular and includes a straight portion.

2. The replica, according to claim 1, wherein the height positioning means of the replica further comprises a notch in the body of the replica, the notch defining a groove extending around a portion of a perimeter of the body in the proximal segment.

3. The replica, according to claim 1, wherein the sectioned vertical surface prevents rotation of the replica about the longitudinal axis of the replica.

4. The replica, according to claim 1, wherein the connection means for connecting the replica to a dental prosthesis is a threaded perforation for the connection of the prosthetic abutments or attachments.

5. The replica, according to claim 1, wherein the connection means for connecting to the dental model comprises connection elements for connecting to removable fastening means.

6. The replica, according to claim 5, wherein said removable fastening means is a screw.

7. The replica, according to claim 1, wherein the connection means for connecting to the dental model is an inner threading to house a screw.

8. The replica, according to claim 1, wherein the distal end comprises an outwardly protruding nut-shaped fixture.

9. The replica, according to claim 1, wherein the distal end comprises an outwardly protruding hexagonal-shaped fixture.

10. The replica, according to claim 1, further comprising a through hole extending from the proximal end to the distal end.

11. The replica, according to claim 1, wherein the proximal end terminates with a flat surface that is orthogonal to the longitudinal axis of the replica and located radially inward of the curved surface.

12. A detachable dental simulation system, comprising a dental model manufactured with 3D additive technology manufactured by adding layers of material which are placed one on top of the other until the dental model is formed, comprising a hole with a bottom and a curved surface where a replica according to claim 1 is supported.

* * * * *